May 26, 1970  D. G. NOILES ET AL  3,514,615
THREAD DISCONTINUITY AND DEFECT DETECTION APPARATUS
Filed Feb. 28, 1967  4 Sheets-Sheet 1
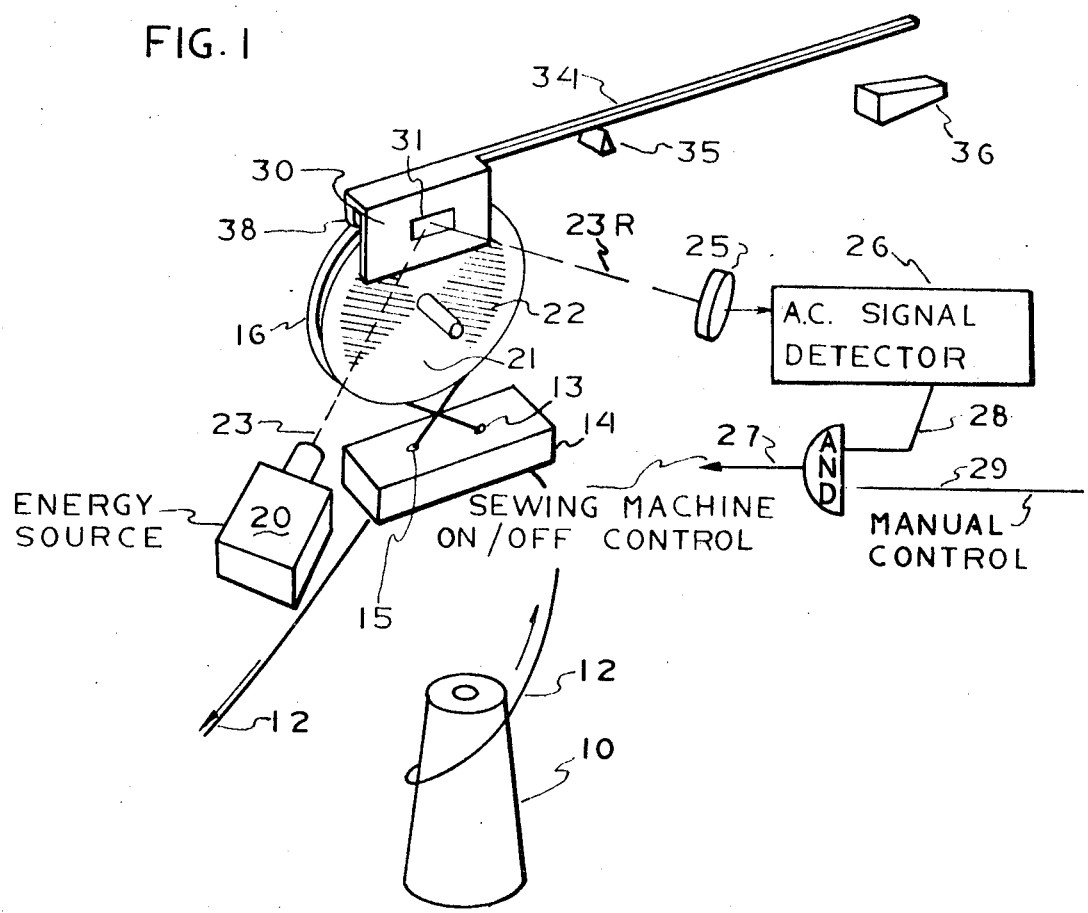
INVENTORS
DOUGLAS G. NOILES
CHARLES SZENTKUTI
ALAN F. SWENSON
ATTORNEY

INVENTORS
DOUGLAS G. NOILES
CHARLES SZENTKUTI
BY ALAN F. SWENSON

ATTORNEY

United States Patent Office 3,514,615
Patented May 26, 1970

3,514,615
THREAD DISCONTINUITY AND DEFECT
DETECTION APPARATUS
Douglas G. Noiles, New Canaan, Charles Szentkuti, Ridgefield, and Alan F. Swenson, Norwalk, Conn., assignors, by mesne assignments, to Ivanhoe Research Corporation, New York, N.Y., a corporation of Delaware
Filed Feb. 28, 1967, Ser. No. 619,380
Int. Cl. G01n 21/30
U.S. Cl. 250—219
16 Claims

ABSTRACT OF THE DISCLOSURE

Thread fed to a sewing machine needle from a supply is threaded around a freely rotatable wheel. The wheel is rotated as the thread is drawn from the supply. Part of the wheel, when rotating, converts substantially continuous wave energy intersecting with the wheel to pulsating or pulsed wave energy. The characteristics of the energy are detected with the pulsating or pulsed wave characteristic indicative of continued rotation and therefore thread continuity. Thread knots, tangles, fiber bunching, enlargement and/or other bulging defects are detected by displacement of a mask which simulates cessation of rotation.

---

The present invention relates to apparatus for detecting discontinuity and defects in thread drawn or pulled, from a storage device and presented to a utilization device.

The present invention is a novel thread discontinuity and thread defect detector particularly useful in detecting thread discontinuity and/or breakage and thread defects such as knots, tangles, fiber bunches, enlargement and/or other bulging defects as thread is passed or drawn from a storage device, such as a spool (sometimes referred to as a cone) to a utilization device, such as a needle or stitching, sewing, knitting and/or weaving device where it is desired to supply thread to the utilization device at a continuous, substantially rapid rate and at very low tension.

According to the context, the term "thread" used generically includes sewing thread, yarn, cord, string, twine, or any other line in solid filament or stranded form and may be cotton, wool, silk, hemp, plastic, rubber, glass, metal, or any combination thereof or any other material made and/or used in the form of thread, for example:

The term "utilization device" as employed herein refers to a sewing, stitching, knitting, braiding or weaving machine or system or any other machine, system or device that may utilize continuous length of thread.

Some utilization devices such as sewing machines operate at very high speed, consuming thread at a relatively high rate. Some such devices also require that the thread be fed to the stitching device at very low tension. In addition, some stitching or sewing machines employ needles or stitching devices which require substantial uniformity in thread diameter.

In most types of stitching operations, it is important to detect thread termination and/or discontinuity before the end of the thread is presented to, or arrives at the needle or stitching device. Early detection of thread discontinuity prevents rethreading the machine thus reducing the "down-time" of the machine.

It is also important to detect thread defects, such as knots, tangles, fiber bunches, enlargements and/or bulges or other defects which increase the diameter of thread, before such defects is presented to a needle or stitching device. Early detection of such defects prevents needle breakage from presentation of oversize diameter thread and/or thread breakage due to the inability of such defect to pass through the eye of the stitching needle.

Thread discontinuity and defect detection has been accomplished with varying degrees of success. However, detection of thread discontinuity and defects in thread being fed rapidly, and at low tension to utilization equipment presents problems which have not been solved by prior art without employing expensive and sophisticated apparatus.

The present thread detector is a novel arrangement, which is inexpensive, reliable and requires but little maintenance, which will quickly and reliably detect defects in the thread before such defect is presented to the feed mechanism of the utilization device, drawing the thread from the spool. In addition, such detection is accomplished without substantially increasing the tension on the thread being fed or conducted to the feed mechanism of a sewing machine or stitching device.

Briefly, the thread discontinuity and defect detector is positioned between the thread supply or spool and the feed mechanism, for drawing thread from a spool and presenting such thread to a utilization device as the needle of a sewing machine. The preferred detection apparatus includes a freely rotatable, mounted wheel, which is grooved about its perimeter and capable of being rotated, by engagement of the thread in the groove of the wheel and conduction of the thread about the wheel as the thread is drawn from the spool to the utilization device or point. The side or disc part of the wheel includes sequentially spaced means for alternatively interfering with and cooperating with energy intersecting with a portion of the side of the wheel. A substantially uniform flow of energy is generated and made to intersect with the side of the wheel. As the thread is conducted to the utilization point from the spool, the wheel is rotated resulting in periodic interference with the uniform flow of energy at the point of intersection. Such periodic interference results in conversion of the uniform of continuous flow of energy into a pulsating or pulsed form of the same energy. The pulsing or pulsating characteristic of the energy is detected and serves as an indication of continuity of thread passing to the feed mechanism.

If the thread should break and/or a thread terminal passes around the wheel, rotation of the wheel will cease resulting in termination of the periodic interference with the beam of continuous energy and loss of the pulsating energy beam. Loss of the pulsating characteristic of the energy beam is detected and serves as an indication of cessation of rotation.

The presence of a knot, tangle, enlargement or other bulging defect in thread passing around the wheel, being conducted to the feed mechanism, is detected by essentially blocking access of the continuous energy flow to the point at which such continuous energy flow intersects with the side of the wheel. This results in cessation of periodic interference with the continuous flow of energy by the wheel, thereby terminating propagation of pulsating or pulsed energy, thus simulating cessation of rotation of the wheel.

The size or characteristics of the wheel and the groove on the perimeter thereof will essentially be determined by the characteristics of the thread being inspected. However, it is preferred that the wheel be light in weight so as that rotation of the wheel may be accomplished with very little energy on the part of the moving thread.

The energy employed may be light energy in the visible or invisible spectrum, sonic energy, electromagnetic energy, pneumatic energy or any type of energy capable of being propagated in a substantially uniform or continuous form and thereafter being converted into a variable or pulsed form by periodic interruption.

The pulsating energy or pulse energy detecting means may be any energy detection means capable of sensing or detecting the energy so generated in response to which such detecting means may provide an electrical output which corresponds to the characteristics of the energy detected. That is, if the energy received or detected is in pulsed or pulsating form, the output will be a pulsed or pulsating electric signal; if the energy detected is continuous in form, the electric output will be continuous in form.

The wheel disc segments may be alternately spaced means for attenuating restraining or limiting and transmitting, conducting or propagating of the energy at the point at which intersection occurs. Thus, as the wheel rotates, a continuous form of energy intersecting with a portion of the disc will be converted into a pulsed or pulsating form of energy as the alternately spaced segments appear at the point of intersection.

The access blocking means may be a mask having an orifice through which the energy passes for effecting intersection with the disc of the wheel with the material of the surface of the mask having attenuating, restraining or limiting characteristics on the energy employed. If the mask should be offset, thereby offsetting the orifice through which the energy normally passes, the energy will be blocked from intersecting with the wheel disc thus terminating conversion of the continuous form to the pulsating form of energy.

It is therefore an object of the present invention to provide thread defect detection apparatus which detects the condition of thread passing from a spool to a utilization device without substantially increasing the tension on the thread.

It is another object of the invention to provide a novel thread discontinuity and knot detector which will detect thread breakage between the spool and the utilization device.

It is another object to provide apparatus for detecting defects such as knots, tangles or other defects in thread before the defect is conducted to the needle of the sewing machine.

Another object is to provide apparatus for detecting thread discontinuity and defects in thread without substantially interfering with the tension on thread being conducted to the needle of a sewing machine.

Another object is to provide apparatus for detecting thread discontinuity and defects in thread without substantially interfering with the tension on thread during relatively high speed feed of the thread between a spool and the needle of a sewing machine.

An additional object is to provide apparatus for detecting thread discontinuity and defects in thread without limitation with respect to the speed at which the thread is fed to the needle of a stitching device.

These and other objects of the invention will become apparent from reading the following detailed description in conjunction with the accompanying drawings in which:

FIG. 1 is a drawing partly in pictorial representation and partly in block form of the preferred form of the invention;

FIGS. 1, 1a and 1b are drawings showing alternate arrangements of the invention;

Referring to FIG. 1, the present invention is presented in preferred embodiment used for thread discontinuity or breakage and knot or defect detection of the thread being fed to a sewing machine or to a sewing system. The present invention is not limited to use in a sewing system, as physical discontinuity or breakage and knot and/or defect detection of any line such as thread, cord, string, rope or wire for example may be accomplished by use of the present invention.

For the sake of clarity the present invention will be described with respect to its use in conjunction with a sewing machine.

Figure 5:
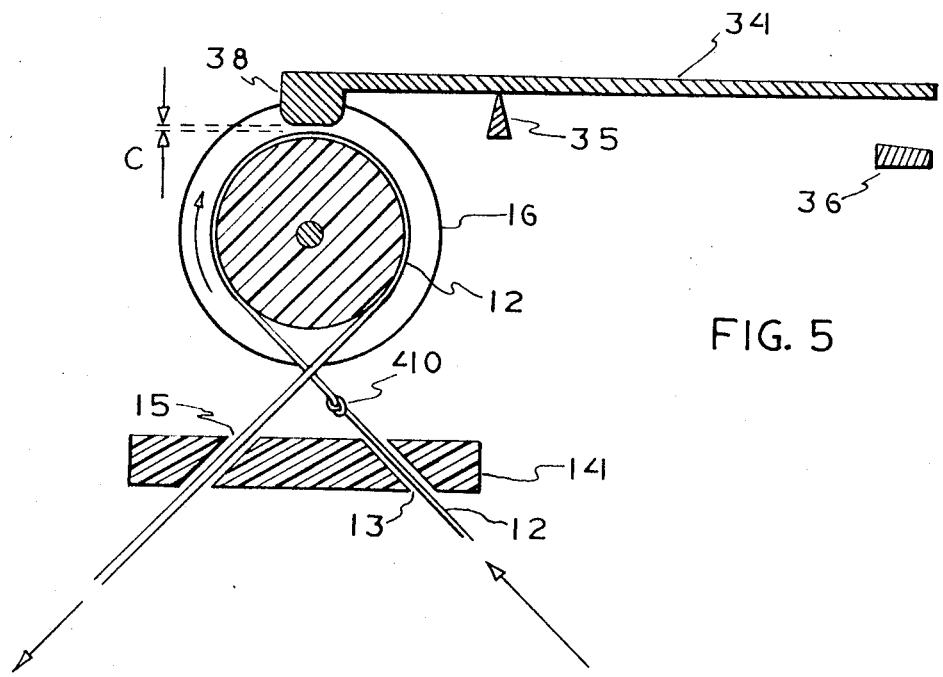
FIG. 5 is a sectional view of the apparatus particularly helpful in understanding the knot detection function.

The rotatable member of the detection apparatus is preferably a freely rotatable light-weight wheel, having low inertia and low friction characteristics, mounted on axle bearing and positioned between the thread supply or spool 10 and the utilization point, such as the needle of the sewing machine (not shown). The wheel has a groove about its perimeter and the wheel is positioned so that the thread may be conveniently guided to nest in the grooved perimeter of the wheel. The thread 12 is drawn from the source 10 through a guide 13 in a block or mounting 14. The guide may be in the form of an orifice in the mounting with the orifice of sufficient diameter to pass a reasonable size knot or other enlargement defect in the thread. FIG. 5 clearly shows such orifice and block or mounting. The guide may also be in the form of an "eye" or "eyelet" or other type of low friction guide. The thread 12 is threaded in the groove of the wheel 16 such that the thread engages the wheel 16 about the greater part of its periphery. In FIGS. 1, 1a and 5, the thread 12 is illustrated as engaging the periphery of wheel 16 for substantially 270 degrees. It should be noted that throughout the drawings corresponding parts are identically labeled. The thread 12 is conducted to and through the outlet guide 15 and is from there conducted to a utilization device such as a sewing machine or other device using the thread.

Figure 4A:
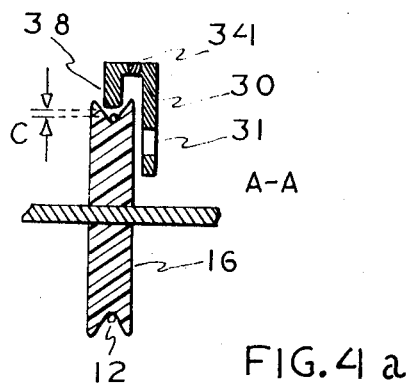
FIGS. 4a and 4b are sectional views of alternate forms of construction, the same part of FIG. 2.
Figure 4B:
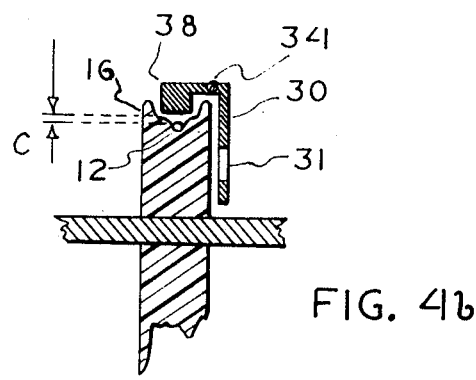

The wheel 16 is preferably a grooved wheel, such as more clearly seen in FIGS. 4a and 4b. The size of the groove depends on the normal diameter of the thread but is of such interior diameter to permit loose nesting of the thread in the groove of the wheel and thus minimize friction when contact is made and thereafter broken between the thread and the surface of the groove. With the thread 12 threaded about the wheel 16 as shown, the wheel 16 will rotate as the thread is drawn about the wheel on its way from the spool 10 to the sewing machine.

The side or disc of the wheel 16 may take any of several forms as more readily seen in FIGS. 6a through 6c, the characteristics of each being described below. Essentially the surface of the disc portion of the wheel 16 in FIG. 1 is similar to that represented in FIG. 6a.

The surface of the disc portion of wheel includes alternately spaced energy reflective and non-reflective portions or segments, the type of energy reflective and non-reflective segments being dependent upon the type and/or characteristics of the energy used.

In its preferred form, the energy employed is light energy which is generated by the energy generator 20 and is beam propagated, from an off-normal position toward the disc or side of the wheel 16. The off-normal position is such that the energy beam 23 may be reflected so as to be received by an energy detector represented by 25, which may be a photodetector.

The disc of wheel 16 is segmented with alternately positioned light energy re-transmitting or reflecting segments 21 and light energy absorbing, attenuating or non-reflecting segments, 22. The reflection segments are represented as clear segments and the non-reflective absorption or segments are represented as lined or hatched segments.

The beam is preferably and is directed to a portion of the disc surface, the area at which the beam intersects with the disc being substantially smaller in diameter than the width of any single segment onto which the beam falls. This ensures the greatest differential between the characteristics (such as amplitude or intensity) of the pulsed or varied beam reflected from the disc.

As the thread is drawn or passed from the source of supply 10 through the inlet guide 13 around the wheel 16, through the outlet guide 15 to the sewing machine, the wheel 16 is rotated. As the wheel rotates the alternately positioned segments of the disc alternately replace each other at the point of intersection by the beam 23 thus alternately reflecting and attenuating the beam of energy at the point of intersection. This converts the substantially uniform flow (continuous wave) beam 23 into a pulsating or pulsed beam 23R. Continued rotation of wheel 16, as by continuous feeding of the thread from the spool to the utilization means, results in continued propagation of the pulsed beam 23R at a pulse frequency depending upon the speed of rotation of the wheel and the size and/or spacing between alternated segments.

If attenuation of the beam 23 by the attenuating (non-reflecting) segment is complete, upon intersection, the beam 23R will be pulsed beam. If attenuation of the beam 23 at the disc is not entirely complete, (partial) the beam 23R will be pulsating.

The energy reflected from the disc, represented by the beam 23R is re-transmitted or reflected to an energy detector, 25 which may be a light sensitive device such as a photo-cell, a photo-detector or any other photovoltaic device which will convert light wave energy into a corresponding electric signal.

In its preferred form, the energy detector, 25 is a photo sensitive device, such as a photo-cell, which is sensitive to light intensity, and is responsive to light differential thus essentially detecting the envelope of the light energy rather than the waves of the spectrum per se. Thus, in response to light reflected from the disc of the wheel, the energy detector 25 will provide an electric signal output corresponding to such light. If the beam 23R is a pulsating or pulsed beam, the signal output of detector 25 will be a pulsating or pulsed electric signal corresponding to the characteristic of beam 23R. If the beam 23R is continuous or uniform flow of energy (including absence of light energy as well as a constant or continuous beam) the output of the detector 25 will be a constant, uniform electric signal, corresponding to the beam 23R.

The output of the detector 25 is applied to a low frequency signal detector, represented by block 26, A.C. Signal Detector, which provides an output in response to detection of the low frequency component of the output of the energy detector 25.

The output of the A.C. signal detector 26 may be applied to an on/off control for controlling the sewing machine. However, as a safety feature the AND gate 27 is included which requires two inputs, one input from lead 28, the output of the A.C. signal detector and the other input 29 labeled Manual Control. This latter control may be in the form of a manual safety cut-off switch, for example. In response to both inputs, the AND gate 27 provides an output which may be applied to the on/off control for the sewing machine.

Upon cessation of rotation of the wheel 16, such as caused by stoppage in the travel of thread or by discontinuity or breakage of the thread drawn around the perimeter of the wheel, absolute alternate attenuation and reflection of the light energy beam will cease, resulting in stabilization of the reflected beam 23R. The output of energy detector 25, which corresponds to the intensity characteristic of beam 23R will settle to a constant value, thus eliminating the low frequency component of the output of detector 25. Absence of the low frequency (AC) component in the signal output of the detector 25 will be detected by the AC signal detector 26 which will result in loss of the output of the detector 26 via lead 28. Loss of output from detector 26 will result in cut-off of the sewing machine by loss of the output of the AND gate 27.

Thus, thread discontinuity or breakage may be detected and when thread discontinuity is detected the sewing machine or sewing system may be automatically shut off.

FIG. 1a illustrates an alternate arrangement for beam interruption and detection in which the beam 23 may be directed along a normal at the disc section of the wheel 16. Instead of beam reflection, beam interruption is provided with the segments of the disc alternated between solid segments 22a and open segments 21a. The energy detector 25 would be positioned on the opposite side of the wheel and in line with the path of the propagated beam 23.

Open segments will permit passage of the beam through the wheel 16 and the solid segments will block passage thus propagating a pulse beam 23R.

If the energy employed is light, the open segments may be at least translucent segments and the solid segments may be opaque segments.

Figure 1B:
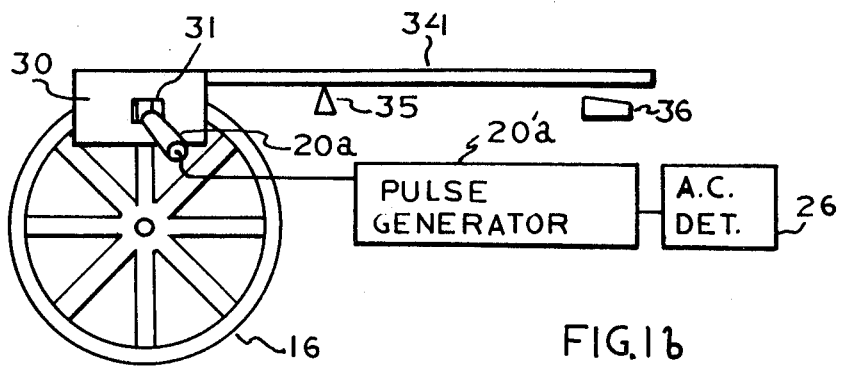
Figure 1A:
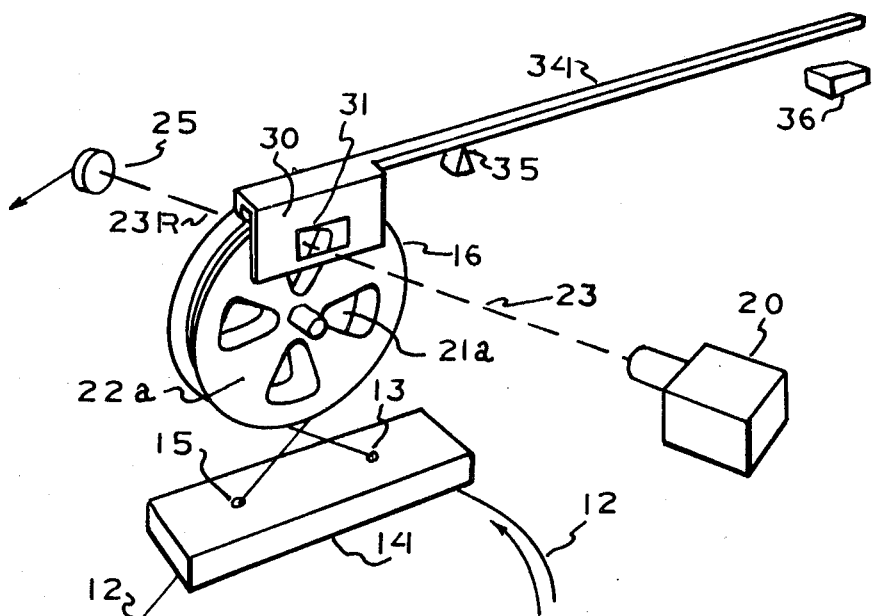

Another alternate form which includes the use of electromagnetic energy, such as a magnetic field generated by driving a coil in the head of an inductive or capacitive proximity sensor, is shown in FIG. 1b. In this arrangement, the wheel 16 is a spoked wheel where the spokes are of such material as to interfere with the magnetic lines of flux in the magnetic field generated by the sensing head. Proximity sensors are well known in the art and it is known that a signal having a low frequency pulse component may be generated when the magnetic lines of flux are periodically distorted or interfered with such as by passage of a spoke of the wheel 16 through the magnetic field.

In each of the disclosed and described embodiments continued rotation of the wheel 16 provides propagation of a varied or pulsed signal which may be detected by a low frequency signal detector.

In order to provide knot, tangle or other enlargement defect detection, cessation of rotation is simulated. Since the area or region of intersection (i.e. where the beam 23 intersects with the side of the wheel 16) is a selected and limited area and rotation of the wheel is sensed by transmission or reflection of energy after the energy has intersected with the rotating wheel at such selected and limited area then, simulation of cessation of rotation of the wheel may be accomplished by essentially blocking access of the beam of energy to the intersection point or area on the disc of the wheel 16.

A mask 30 is provided which essentially covers a large portion of the disc. An aperture or orifice 31 is provided to permit passage of the beam of energy through the mask 30, so as to effect intersection with the disc of the wheel. The aperture or orifice is located in the mask so that when the mask is in its normal position, normally covering the disc of the wheel, the beam of energy 23 passes through the orifice 31 and makes contact with the disc of the wheel 16 at the point of intersection.

When the mask 30 is displaced from its normal position, the orifice 31 is also displaced and access by the beam to the point of intersection with the wheel blocked. Thus, displacement of the mask 30 (and therefore the orifice 31) serves as an effective means of simultating cessation of wheel rotation. This may be readily seen in FIGS. 2 and 3.

Figure 2:
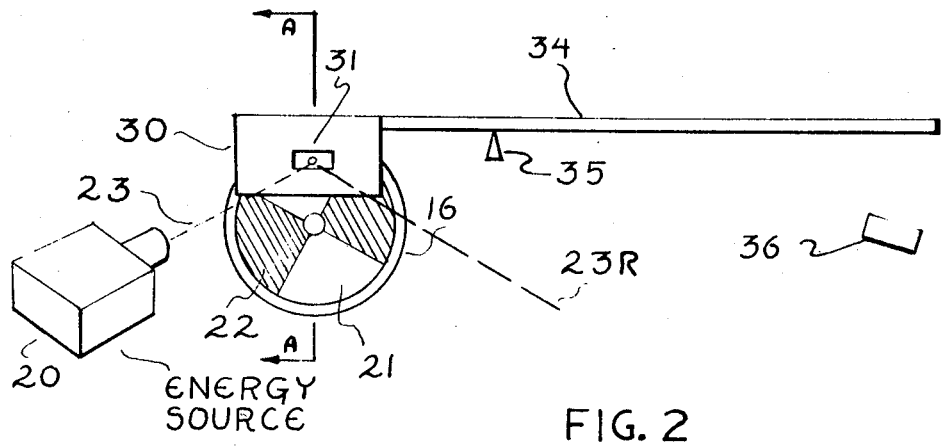
FIG. 2 is a drawing helpful in understanding the invention.

In FIG. 2, the mask 30 is illustrated in its normal position, that is, covering a large portion of the wheel 16. Preferably, the mask 30 is balance-positioned as by use of an arm or rod 34 and a pivot 35. When the balanced assembly is in its normal position (shown in FIG. 2) the columniated beam 23 passes through the orifice 31 of the mask 30 and intersects with the disc of wheel 16. As illustrated, the beam 23 may then be reflected by the segment 21 appearing under the orifice in the mask. The reflected beam is indicated as beam 23R.

Figure 3:
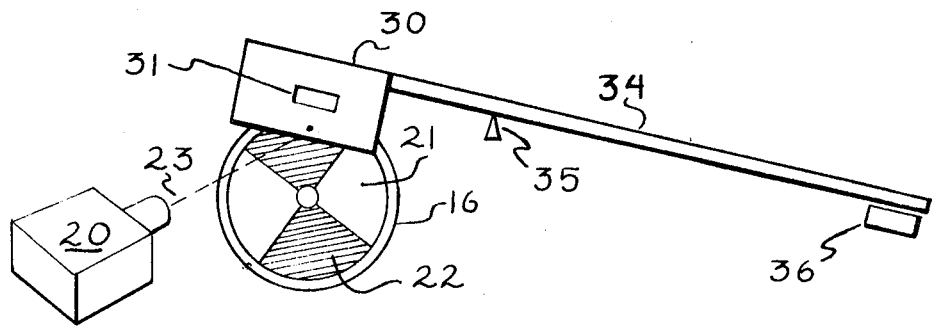
FIG. 3 is a drawing helpful in understanding the invention.

In FIG. 3, the mask 30 is illustrated in a displaced condition with the orifice or aperture 31 displaced or offset from the normal path of the columniated beam. As illustrated in FIG. 3, access for the beam 23 to the intersection point in the wheel is blocked by the mask 30, the surface of which may attenuate the beam energy. In order to maintain this condition, until reset, the rod 34 is "captured" by a device 36, which may be a magnet, for example, which holds the balanced assembly displaced or offset from its normal, balanced position. This condition displaces the mask 30 and orifice 31 thereby holding access for the beam 23 to the intersection point on the wheel 16, blocked.

Another function of the mask and orifice is to eliminate spurious light beams and/or other light energy which may otherwise be reflected by the reflective segment 21 of the wheel 16 from being reflected to the detector 25 along the path normally followed by reflected beam 23R.

Detection of a thread enlargement defect, knot and/or tangle is made when such enlargement defect passes around the perimeter of the wheel 16 and strikes the clearance sensitive member 38, which is coupled to the mask 30 and rod 34, seen clearly in FIGS. 4a, 4b and 5.

Essentially, the balanced assembly, including a thread enlargement sensing means or clearance sensitive member 38, mask 30 and rod 34 is positioned to permit passage of thread 12 under the thread enlargement sensing means 38. A clearance, C is provided between the sensing means 38 and the thread 12, which essentially limits the size of allowance thread diameter, so that when a thread enlargement defect exceeding such allowable diameter (represented by knot 40) passes around the wheel 16, the enlargement will strike the sensing means 38 and displace the balanced assembly, such as illustrated in FIG. 3.

Preferably, the balanced assembly is position-balanced so that the sensing means 38 "floats" clear of the surface of the groove, but normally over the thread 12 at the clearance level, C. This prevents friction generated by physical contact between the sensing member, 38 and the wheels, 16.

As seen in FIG. 4a, for example, the groove in wheel 16 converges from a wide inside at the extreme perimeter of the wheel to a substantially narrow inside at the floor or base of the groove. The inside diameter of the base of the groove is slightly larger than the outside of the thread. The reduction in the width of the groove may be substantially gradual, as shown in FIG. 4a, or may be in stepped graduation, such as seen in FIG. 4b.

The thread is normally substantially uniform in diameter along its length, and thus the distance between the rim of the wheel (top of the groove) and the top surface of the thread lying in the groove may be anticipated to be substantially constant for any particular size thread and wheel (groove) used.

A defect such as knot, tangle, fiber bunching, swelling and/or other bulging in the thread will effectively increase the thickness of the thread and when such defect is nested in the groove of the wheel, the distance between the rim of the wheel and the top surface of the thread will be reduced. A knot or tangle will effectively at least double the thickness of the thread thus reducing the clearance by at least the normal diameter of the thread.

An allowable clearance C above the top of the thread 12 nested in the groove is established by the clearance sensitive member 38, which floats in the groove over the thread 12. The member 38 is coupled to the mask 30 thus forming the balanced assembly including the rod 34, mask 30, thread-top clearance member 38. When a knot or tangle attempts to pass the clearance sensitive member 38, the knot will strike the member 38 and cause the mask 30 and clearance detector 38 of the balanced assembly, to rise, pivoting about the pivot 35. The end of rod 34 adjacent the magnet 36 lowers and makes contact with the magnet 36 which "captures" the balanced assembly holding the mask 30 (an orifice 31) offset from its normal position, such as shown in FIG. 3. The access for the beam 23 to the intersecting point on the disc of wheel 16 is blocked terminating the periodic interference with beam and therefore terminating propagation of a pulsed beam of energy. Thus knots and/or tangles and other defects producing diameter enlargement in thread passing from the spool 10 through the detection device are detected through simulated cessation of rotation in response to passage of such defect, knot or tangle about the wheel 16. In some cases, the clearance member 38 and rod 34 may be one and the same at the point of defect detection and the mask 30 may extend over and couple with the top of the rod 34.

The defect, knot and/or tangle detection system may be used to detect slight irregularities (enlargement) in thread diameter which may result from strand or filament bunching a section of thread to have an excessively large diameter. In the instant case the allowable clearance C may become more critical than that employed in knot detection in a sewing machine system.

Other arrangements may be made for capturing the balanced assembly and obtain the same effect as described. In some instances, it may be desired to bias the rod, mask and clearance detection member assembly for more positive nesting of the member 38 in the groove of the wheel.

The wheel 16 may be of any material capable of performing the function described although it is preferably light in weight and at least has the sides of the groove about its perimeter lined with a very low or negligible friction material, such as nylon or Teflon. In some cases, it may be desirable to have the bed or bottom of the groove lined with rubber or other material which will aid in rotating the wheel as the thread passes around the wheel.

Essentially two different types of arrangements have been described for performing pulsed beam propagation. These may be referred to as type BR (beam reflection) and type BI (beam interruption). Beam reflection, the preferred arrangement is illustrated in FIG. 1, while beam interruption is illustrated in FIG. 1a.

FIG. 1b illustrates another arrangement which may be considered both type BR and BI. However, it could be said that the magnetic lines of flux are distorted rather than reflected or interrupted. FIG. 1b illustrates an inductive proximity head 20a mounted adjacent to the mask 30 so that the magnetic line of flux of the magnetic field generated by the proximity head pass through the orifice 31 so as to at least embrace the spokes forming the disc section of wheel 16.

Rotation of the wheel 16 will distort or interfere with the magnetic field as a spoke passes through the lines of flux thus changing the inductance in the coil generating the magnetic energy. The pulsating change in inductance may be sensed and indicated by the pulsed output of a pulse generator 20a.

When rotation of the wheel ceases, the pulsating or periodic change in industance ceases thus terminating the pulsed output of pulse generator 20a.

To simulate cessation of rotation, the mask 30 may be offset thus offsetting the orifice 31 from its normal position, so that the surface of the mask "captures" the magnetic lines of flux effectively holding the inductance stable and simulating cessation of rotation.

Figure 6A:
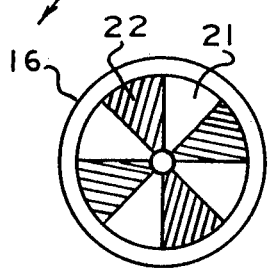
FIGS. 6a through 6c are drawings showing different forms of disc surfaces embraced in the invention.
Figure 6B:
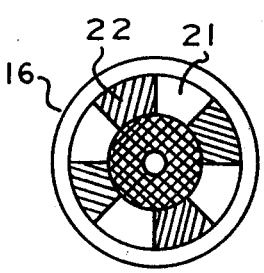
Figure 6C:
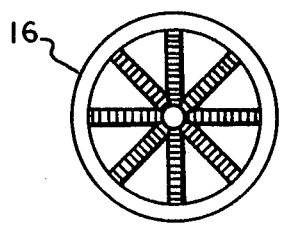

FIGS. 6a, 6b and 6c illustrate, without limitation, several different forms of wheel disc which may be used in conjunction with beam reflection and/or beam interruption. FIG. 6a shows that the segments 21 may be reflective, translucent, or open while the segments 22 may respectively be non-reflective opaque or solid.

The combination of reflective and non-reflective segments may be used in conjunction with light energy, sonic energy or microwave energy, for example. The combination of translucent and opaque sections may be easily used in conjunction with light energy. The combination of open and solid segments may be used with any type of beam propagated energy as well as magnetic energy and pneumatic energy.

FIG. 6b illustrates a disc segmented circumferentially, partly along the radius which differs from the full radius circumferentially segemented disc of FIG. 6a. FIG. 6c illustrates a spoked wheel which may be distinguished from the more solid disc types of FIGS. 6a and 6b.

It will be appreciated that the present thread break and thread enlargement defect detector may be employed in association with an utilization device (a sewing machine, for example) which operates on a cyclic or intermittent basis by providing a signal which overcomes the loss of the operating signal 28 when the utilization device comes to a normal stop, in its cycle of operation.

When such normal cyclic stop occurs, a signal may be generated and fed into an OR gate, along with the signal provided by lead 28, in FIG. 1. The output of the OR gate may then be applied to the AND gate as shown. Effectively, any stoppage of the utilization device will stop the drawing of thread from the supply 10 and thus rotation of the wheel 16 will cease. Such thread stoppage will cause loss of the pulsating signal received by the detector 25 and therefore, loss of the AC envelope in the signal applied to the AC signal detector 26. Loss of the AC envelope will result in loss of the operating signal on lead 28. It is proposed to overcome normal loss of the operating signal on lead 28 due to a normal machine-stoppage by providing an alternate operating signal when such normal machine-stoppage occurs.

With such arrangement, the present invention may be used with an utilization device which operates intermittently, or on a cyclic basis, or the present invention may be used as described above, with an utilization device which operates on a substantially continuous basis.

It will also be appreciated that although the rotatable member is shown and described as a wheel, any rotatable member, whether circular or non-circular, may be used which serves the same function, i.e., rotated by passage of the thread substantially around the rotatable member. In addition, such rotatable member may be so constructed so that the means for intermittently interfering with the energy beam is remote from the rotatable member itself, but is rotated in conjunction with the rotatable member.

Although the preferred embodiment and several alternate embodiments have been illustrated and described and several forms of energy have been mentioned as being compatible for use in the present invention, limitation to such embodiments and/or forms of energy is not to be inferred, nor is use of such invention for thread discontinuity limited to the materials mentioned. Other changes, alterations and substitutes may be made, as will be familiar to those skilled in the art, without departing from the spirit of the invention as defined in the appended claims.

What is claimed is:

1. Thread discontinuity and enlargement defect detecting apparatus for use in a thread utilization machine wherein the thread is supplied from a supply source to the utilization mechanism, said detecting apparatus being capable of operating without significant thread tension and being adapted to sense the thread at a location intermediate the source and the utilization mechanism for detecting discontinuities or enlargement defects in the thread which would interrupt the operation of the utilization mechanism, said detecting apparatus comprising:
   a wheel member,
   rotatable support means supporting said wheel member for easy rotation,
   guide means for guiding said thread to pass around a sufficient portion of the perimeter of said wheel for rotating said wheel as said thread travels to said utilization mechanism,
   means sensing cessation of rotation of said wheel for detecting discontinuity in said thread,
   means for sensing enlargement defects in the thread for responding to enlargements which exceed the normal thread diameter by more than an acceptable amount including a displaceable sensing element positioned near the thread in a region where it is passing around said wheel member, said sensing element being normally spaced from the thread by a predetermined small space and,
   means responsive to displacement of said sensing element by an unacceptable enlargement defect in the thread for detecting such defect, whereby the thread is enabled to be supplied to said utilization mechanism without significant tension and discontinuities or enlargement defects are reliably detected.

2. Thread discontinuity and enlargement defect detecting apparatus as in claim 1 in which said wheel member has a groove in its perimeter, and
   said guide means guides the said thread for running in said groove,
   said groove accommodating thread of normal diameter, and
   said displaceable sensing element is positioned near to said thread in said groove.

3. Apparatus for detecting discontinuity and enlargement defects in thread supplied from a supply source to a utilization device, said detecting apparatus being capable of operating without signficant thread tension and being adapted to sense thread between said supply source and said utilization device, said detecting apparatus comprising:
   a wheel member substantially around which said thread is drawn,
   bearing means for supporting said wheel for easy rotation,
   guide means for guiding said thread for passing around a sufficient portion of the perimeter of said wheel for rotating said wheel as said thread is drawn from said supply source to said utilization device,
   means for sensing cessation of rotation of said wheel for detecting discontinuity in said thread,
   control means responsive to said sensing means for discontinuing operation of said utilization device when said sensing means senses cessation of rotation of said wheel,
   displaceable means responsive to passage, around said wheel, of an enlargement in said thread which exceeds the normal thread diameter by at least a predetermined amount for simulation cessation of rotation of said wheel member, and
   said control means responsive to response by said displaceable means for discontinuing operation of said utilization device when said displaceable means simulates cessation of rotation of said wheel member.

4. Apparatus for detecting discontinuity and enlargement defects in thread as in claim 3 and in which said wheel member includes:
   a groove about the perimeter thereof for receiving the thread, and
   said displaceable means is positioned for riding in said groove with a space between the thread in the groove and said displaceable means, said space for defining the allowable tolerance in increased thread diameter passing to said utilization device.

5. Apparatus for detecting discontinuity and enlargement defects in thread as in claim 3 and in which said wheel member is light-weight wheel having a groove about the perimeter thereof,
   said groove for receiving thread drawn from said supply source,
   said guide means guides the thread into said groove, and
   said displaceable means is positioned for riding in said groove with a clearance between the thread in the groove and said displaceable means, said clearance for defining the tolerable enlargement of thread diameter passing from the supply source to said utilization device.

6. Apparatus for detecting discontinuity in thread drawn from a storage means and presented to a utilization device including:
   a freely rotatable member, a substantial part of the perimeter of which forms part of the path along which the thread is drawn for rotating said rotatable member as the thread is drawn from said storage means to said utilization device, means responsive to cessation of rotation of said rotatable member for detecting discontinuity in said thread, and displaceable means responsive to passage, around said rotatable member of an enlargement in said thread which exceeds the normal thread diameter by at least a predetermined amount for simulating cessation of rotation of said rotatable member.

7. Apparatus for detecting discontinuity and enlargements in thread drawn from a storage means and presented to a utilization device including:

a freely rotatable member, part of the perimeter of which forms part of the path along which the thread is drawn, for rotating said rotatable member as said thread is drawn from said storage means to said utilization device, means for generating energy having a first characteristic and for transmitting said energy for intersecting with a region of said rotatable member, said rotatable member including means for converting said first characteristic into a second characteristic upon said energy intersecting with said rotatable member when said rotatable member is rotating, means responsive to absence of said second characteristic for sensing cessation of rotation of said rotatable member for detecting discontinuity in thread, and displaceable means responsive to passage, around said rotatable member, of an enlargement in said thread which exceeds the normal thread diameter by at least a predetermined amount for preventing intersection of said energy with said rotating member for preserving said first characteristic thereby simulating cessation of rotation of said rotatable member.

8. Apparatus for detecting discontinuity and enlargements in thread drawn from a storage means as in claim 7 and in which said means for converting includes sequentially adjacent segments having substantially opposite effect relative to said energy.

9. Apparatus for detecting discontinuity and enlargements in thread drawn from a storage means as in claim 8 and in which said displaceable means includes a mask, normally positioned for non-interference with the intersection of said energy with said sequentially adjacent segments and repositioned in response to passage, around said rotatable member, of said enlargement in said thread for preventing intersection of said energy with said sequentially adjacent segments.

10. Apparatus for detecting defects in thread drawn from a storage means and presented to a utilization device including:

a freely rotatable wheel having a groove about the perimeter thereof for receiving thread conducted between said storage means and said utilization device, said wheel also including a disc comprising first means for interfering with transmission of energy intersecting with said first means, and second means for assisting transmission of energy intersecting with said second means, mask means, covering a portion of said disc and having an aperture therein for defining an area on said disc at which said energy normally intersects with said disc, means for generating a substantially continuous flow of energy and for transmitting said energy through said aperture for intersecting with said disc at said defined area, said mask means being displaceable in response to passage, around said wheel and in said groove, of an enlargement in said thread which exceeds the normal thread diameter by at least a predetermined amount for offsetting said aperture for preventing intersection of said energy with said disc, and means for providing an output for operating said utilization device in response to reception of said energy after having intersected with said disc and having pulsating characteristics.

11. Apparatus for detecting defects in thread drawn from a storage means and presented to a utilization device including:

a freely rotatable wheel having a groove about the perimeter thereof for receiving thread conducted between said storage means and said utilization device, said wheel also including a disc comprising first means for interfering with transmission of energy intersecting with said first means, and second means for assisting transmission of energy intersecting with said second means, mask means, covering a portion of said disc and having an aperture therein for defining an area on said disc at which said energy normally intersects with said disc, means for generating a substantially uniform flow of energy and for transmitting said energy through said aperture for intersecting with said disc at said defined area, displaceable means positioned in said groove and spaced from said thread in said groove for defining an allowable tolerance in the diameter of said thread, said displaceable means coupled to said mask for offsetting said aperture from its normal position when a thread enlargement defect passes said displaceable means and displaces said displaceable means, said mask means and said aperture, and means for providing an output for operating said utilization device in response to reception of said energy after having intersected with said disc and having pulsating characteristics.

12. Apparatus for detecting discontinuity in thread and bulging defects in thread drawn from a storage means and presented to a utilization device including:

a freely rotatable wheel having a groove about the perimeter thereof, said groove forming a part of the path along which said thread is drawn, said wheel being rotated by thread conducted from said storage to said utilization device, means for generating a beam of energy at a substantially continuous, uniform rate and for transmitting said beam for intersecting with a selected portion of said wheel, mask means for covering a substantial portion of said wheel, said mask including an orifice normally positioned for defining said selected portion of said wheel and for providing passage of said beam through said mask, said mask being displaceable from its normal position in response to passage of said bulging defects in said thread about said perimeter of said wheel for offsetting said orifice from said normal position of said orifice for preventing passage of said beam through said mask, said wheel including a first segment for attenuating said energy intersecting with said first segment, and a second segment for transmitting said energy intersecting with said second segment whereby when said wheel is rotated and said mask means is in its normal position said first segment and said second segment alternately appear at said orifice and the beam of continuous, uniform energy so intersecting with said wheel is converted into a pulsating beam, energy detection means for receiving said energy after said energy intersects with said wheel and for providing an electric output corresponding to the energy so received, and means responsive to said electric output for providing an operating signal to said utilization device when said electric output is pulsating.

13. Apparatus for detecting discontinuity in thread and bulging defects in thread drawn from a source of supply and presented to a utilization device including:
- a freely rotatable member, part of the perimeter of which forms part of the path of the thread between the source of supply and the utilization device, for rotating said rotatable member when said thread is drawn from said source to said utilization device,
- means for generating a substantially uniform flow of energy and for transmitting said energy in a beam for intersecting with a selected area of said rotatable member,
- said rotatable member including first means for cooperating with said energy when said energy intersects with said first means, and
- second means for attenuating said energy when said energy intersects with said second means,
- said first means and said second means alternately presented at said selected area as said rotatable member rotates,
- mask means for covering a large portion of said rotating member and including an orifice for according access for said beam to said selected area,
- displaceable sensing means coupled to said mask means for positioning said mask and said orifice,
- said displaceable sensing means positioned and spaced from said thread on said perimeter for sensing bulging defects in thread passing said sensing means, said displaceable sensing means, said mask and said orifice being displaced upon passage of a bulging defect exceeding said space,
- energy detector means for detecting said energy after said energy intersects with said first means in said selected area and for providing an electric signal corresponding to the energy detected, and
- means for sensing said electric signal and for providing a control signal for operating said utilization device in response to said electric signal including pulsating characteristics.

14. Apparatus for detecting discontinuities in thread and bulging defects in thread as in claim 13 and in which said rotatable member is a wheel and said wheel includes a groove about the perimeter thereof for receiving said thread.

15. Apparatus for detecting discontinuity in thread and bulging defects in thread as in claim 13 and in which:
- said rotatable member is a wheel,
- said energy generated is light and a beam of light is transmitted to intersect with said selected area of said wheel, and
- said first means has light reflection characteristics and said second means has light absorption characteristics.

16. Apparatus for detecting discontinuity in thread and bulging defects in thread as in claim 13 and in which:
- said rotatable member includes a groove about the perimeter thereof for receiving said thread,
- said energy generated is light energy and a beam of light is transmitted to intersect with said selected area,
- said first means has light reflection characteristics,
- said second means has light absorption characteristics,
- said mask has a common characteristic with respect to said light energy, and
- said energy detector is a photo detector which converts light energy into corresponding electric energy.

References Cited
UNITED STATES PATENTS

| | | | |
|---|---|---|---|
| 1,882,962 | 10/1932 | Sawford | 250—219 X |
| 2,529,161 | 11/1950 | Kelling et al. | 250—219 |
| 2,989,690 | 6/1961 | Cook | 250—219 X |
| 3,238,375 | 3/1966 | Johnson | 250—219 |
| 3,264,559 | 8/1966 | Eppler | 250—219 X |
| 3,345,812 | 10/1967 | Pickering | 356—159 X |
| 3,408,500 | 10/1968 | Carr | 66—125 X |

WALTER STOLWEIN, Primary Examiner

U.S. Cl. X.R.

66—163; 250—231; 356—159